United States Patent
Vayssiere et al.

(10) Patent No.: US 8,250,146 B2
(45) Date of Patent: Aug. 21, 2012

(54) SERVICE ADAPTATION MACHINE

(75) Inventors: Julien Jean-Pierre Vayssiere, Red Hill (AU); Wen Shin Kenneth Wang, Upper Mount Gravatt (AU); Marlon G. Dumas, Rapla (EE); Chun Ouyang, Parkinson (AU)

(73) Assignee: SAP AG, Walldorf (DE)

( * ) Notice: Subject to any disclaimer, the term of this patent is extended or adjusted under 35 U.S.C. 154(b) by 763 days.

(21) Appl. No.: 12/120,990

(22) Filed: May 15, 2008

(65) Prior Publication Data

US 2009/0285224 A1 Nov. 19, 2009

(51) Int. Cl.
G06F 15/16 (2006.01)

(52) U.S. Cl. ......... 709/205; 709/230

(58) Field of Classification Search ........... 709/230
See application file for complete search history.

(56) References Cited

U.S. PATENT DOCUMENTS

| 6,453,356 | B1 | 9/2002 | Sheard et al. | |
|---|---|---|---|---|
| 2007/0100717 | A1* | 5/2007 | Holmes et al. | 705/35 |
| 2007/0198437 | A1* | 8/2007 | Eisner et al. | 705/79 |
| 2008/0065994 | A1* | 3/2008 | Wang et al. | 715/746 |
| 2008/0209438 | A1* | 8/2008 | Jackson et al. | 719/313 |
| 2008/0243725 | A1* | 10/2008 | Homan-Muise et al. | 705/400 |
| 2009/0106329 | A1* | 4/2009 | Masuda | 707/202 |
| 2009/0138895 | A1* | 5/2009 | Dumas et al. | 719/315 |

OTHER PUBLICATIONS

Camara et al. An Aspect-Oriented Adaptation Framework for Dynamic Component Evolution. Mar. 2007.*
Bracciali et al. "A Formal Approach to Component Adaptation". 2005. Journal of Systems and Software, pp. 45-54.*
Cubo et al. Context-Based Adaptation of Component Behavioural Interfaces. 2007. Springer-Verlag Berlin Heidelberg. pp. 305-323.*
Cavallaro et al. Context-Based Adaptation of Component Behavioural Interfaces. May 2008. SEAMS.*
Wang et al. The Service Adaptation Machine. 2008.*
Camara et al. Composition and Run-time Adaptation of Mismatching Behavioural Interfaces. Jul. 2008.*
Wu, Zixin et al., "Composing Semantic Web services with Interaction Protocols", LSDIS Lab, University of Georgia, Athens, Georgia., (2006).
Verma, Kunal et al., "The Meteor-S Approach for Configuring and Executing Dynamic Web Processes", LSDIS Lab, University of Georgia, Athens, Georgia, (Jun. 24, 2005).
Alonso, Gustavo et al., "ADAPT: Middleware Technologies for Adaptive and Composable Distributed Components", ADAPT IST-2001-37126, (Aug. 2004).
Benatallah, Boualem et al., "Developing Adapters for Web Services Integration", CAiSE 2005, LNCS 3520, (2005), pp. 415-429.

(Continued)

*Primary Examiner* — Joshua Joo
*Assistant Examiner* — Bryan Lee
(74) *Attorney, Agent, or Firm* — Brake Hughes Bellermann LLP (57) ABSTRACT

A system may include a gateway that is configured to intercept messages being exchanged between multiple services, a message repository that is logically coupled to the gateway and that is configured to store the intercepted messages, a service description repository that is configured to store multiple service descriptions, where each of the service descriptions corresponds to one of the services, a rules repository that is configured to store mapping rules and an adaptation engine that is configured to generate a sequence of firing rules using the service descriptions and the mapping rules responsive to the intercepted messages, to generate one or more outgoing messages in response to the intercepted messages using the sequence of firing rules, and to detect at runtime an occurrence of a termination anomaly.

19 Claims, 5 Drawing Sheets

OTHER PUBLICATIONS

Taher, Y et al., "Using CEP technology to adapt messages exchanged by Web services", WWW 2008, Beijing, China, available online at http://www2008.org/papers/pdf/p1231-taherA.pdf (Apr. 21, 2008).

Fuchs, Matthew, "Adapting Web Services in a Heterogeneous Environment", Proceedings of the IEEE International Conference on Web Services (ICWSO4), (Mar. 2004).

Kongdenfha, Woralak et al., "An Aspect-Oriented Framework for Service Adaptation", ICSOC 2006, LNCS 4294, (2006), pp. 15-26.

Nezhad, Motahari H., et al., "Semi-Automated Adaptation of Service Interactions", WWW 2007, Banff, Alberta, Canada. ACM , (May 8, 2007), pp. 993-1002.

Dumas, Marlon et al., "Adapt or Perish: Algebra and Visual Notation for Service Interface Adaptation", Proceedings 4th International Conference on Business Process Management 4102/2006, Vienna, Austria; http://eprints.qut.edu.au, (2006), pp. 65-80.

Cimpian, Emilia, et al., "D13.7 v0.1 Process Mediation in WSMX", WSMX Working Draft. http://www.wsmo.org/TR/d13.7/v0.1/20050708/, (Jul. 8, 2005).

Cimpian, Emilia et al., "WSMX Process Mediation" Second WSMO Implementation Workshop, (Jun. 2005).

* cited by examiner

SERVICE ADAPTATION MACHINE

TECHNICAL FIELD

This description relates to a service adaptation machine.

BACKGROUND

Service-oriented architectures may decompose systems into coarse-grained software artifacts (namely services) that expose information, rules and processes across ownership domains. This approach may lead to architectures that are aligned with the business domain and can seamlessly evolve in response to changes in business requirements. On the other hand, since services are coarse-grained, their reuse and evolution may require the introduction of complex adapters. Indeed, when services encapsulate long-running business processes, their interfaces may often be conversational, meaning that they capture multiple interactions related through control-dependencies. Thus, when reusing a service, one needs to deal with mismatches, not only at the level of individual interactions, but also across interactions occurring in the context of a conversation.

For example, consider the situation where a customer service is required to interact with a supplier service. The customer service may send a purchase order (PO) and then expect to receive a single order response. The supplier service on the other hand may receive the PO and reply with a PO response followed by one or more PO updates (to keep the customer informed of the fulfillment of the order), until the supplier service finally issues a PO confirmation to mark the completion of the fulfillment process. In this example, the services are incompatible because the customer service never receives the expected single order response from the supplier service, but instead the customer service may receive multiple PO responses and a PO confirmation that the customer service may not be able to process. Thus, the interfaces or service descriptions that may represent the life cycle of each of the services have at least one mismatch. In this example, the interface of the customer service may be based on a fragment of the extensible markup language (XML) common business library (xCBL), which is an XML component library or business-to-business e-commerce framework, or it may be based on a fragment of the universal business language (UBL), which is a generic XML interchange format and set of rules for exchanging electronic business documents. Whereas, the supplier service interface may be based on a RosettaNet standard interface process, which is another interchange format and set of rules for exchanging electronic business documents.

One approach to reconcile incompatibilities such as those exposed by this example may be to introduce adapters that resolve differences between pairs of services on a case-by-case basis. However, this approach may lack scalability and lead to a proliferation of adapters that need to be maintained as the underlying services and their interconnections evolve. Consequently, there may be a need for improved techniques to reconcile incompatible services.

SUMMARY

In one general aspect, a system may include a gateway that is configured to intercept messages being exchanged between multiple services, a message repository that is logically coupled to the gateway and that is configured to store the intercepted messages, a service description repository that is configured to store multiple service descriptions, where each of the service descriptions corresponds to one of the services, and a rules repository that is configured to store mapping rules. The system may include an adaptation engine that is configured to generate a sequence of firing rules using the service descriptions and the mapping rules responsive to the intercepted messages, to generate one or more outgoing messages in response to the intercepted messages using the sequence of firing rules, and to detect at runtime an occurrence of a termination anomaly.

Implementations may include one or more of the following features. For example, the message repository may be configured to store and to track the outgoing messages. The service description repository may include one or more service interfaces. A service interface may describe one or more messages that a service may send or receive, and may additionally describe an order in which messages may be sent or received. In one implementation, a service interface may include a finite state machine, where the service interface finite state machine captures a life cycle of each instance of the service, from a start state to an end state. The service interface finite state machine may include states and transitions.

The mapping rules may be independent of a particular service description such that the mapping rules are applicable to multiple different service descriptions. In one implementation, the termination anomaly may be a deadlock situation. In another exemplary implementation, the termination anomaly may be an information loss situation.

The adaptation engine may include a rules selection module that is configured to retrieve one or more of the intercepted messages from the message repository, to retrieve one or more of the mapping rules from the rules repository, to retrieve one or more of the service descriptions from the service description repository, to determine whether the intercepted messages are expected and to retain expected messages and to relate the expected messages to the mapping rules and to the service descriptions and to generate the sequence of firing rules using the service descriptions and the mapping rules responsive to the intercepted messages.

The adaptation engine may include a rules firing module that is configured to execute the sequence of firing rules and to release a single output message to the gateway for communication to one of the services. The adaptation engine may include an adapter state manager that is configured to maintain a message repository, to monitor the state for each of the instances of the services, to maintain a history of rules that have been fired for each of the instances of the services, and to initiate the generation of the sequence of firing rules and the generation of the outgoing messages using the message repository, the state for each of the instances of the services and the history of the rules that have been fired. The adaptation engine may be further configured to provide an indication to one or more of the services when the occurrence of the termination anomaly is detected.

In another general aspect, a system may include a gateway that is configured to intercept messages being exchanged between multiple services, a message repository that is logically coupled to the gateway and that is configured to store the intercepted messages, a service description repository that is configured to store multiple service descriptions, where each of the service descriptions corresponds to one of the services, a rules repository that is configured to store mapping rules, and an adaptation engine. The adaptation engine may include a rules selection module, a rules firing module, and an adapter state manager. The rules selection module may be configured to retrieve one or more of the intercepted messages from the message repository, to retrieve one or more of the mapping rules from the rules repository, to retrieve one or more of the service descriptions from the service descriptions repository, to determine whether the intercepted messages are expected and to retain expected messages, and to relate the expected messages to the mapping rules and to the service descriptions and to generate a sequence of firing rules using the service descriptions and the mapping rules responsive to the intercepted messages. The rules firing module may be configured to execute the sequence of the firing rules and to release a single output message to the gateway for communication to one of the services. The adapter state manager may be configured to maintain a message repository, to monitor a service state for each of the instances of the services, to track a history of the rules that have been fired and to initiate the generation of the sequence of firing rules and the generation of the outgoing messages using the message repository state, the service state for each of the services and the history of the sequence of the firing rules.

Implementations may include one or more of the following features. For example, the adaptation engine may be configured to detect at runtime an occurrence of a termination anomaly. In one implementation, the termination anomaly may be a deadlock situation. In another exemplary implementation, the termination anomaly may be an information loss situation.

The service description repository may include a service interface finite state machine for each of the services, where the service interface finite state machine may capture a life cycle of each instance of the services from a start state to an end state. The mapping rules may be independent of a particular service description such that the mapping rules are applicable to multiple different service descriptions.

In another general aspect, a method may include intercepting messages being exchanged between multiple services, storing the intercepted messages, storing multiple service descriptions, where each of the service descriptions corresponds to one of the services, generating a sequence of firing rules using the service descriptions and the mapping rules responsive to the intercepted messages, generating one or more outgoing messages in response to the intercepted messages using the sequence of the firing rules, and detecting at runtime an occurrence of a termination anomaly.

Implementations may include one or more of the following features. For example, detecting at runtime the occurrence of the termination anomaly may include detecting at runtime a deadlock situation. Detecting at runtime the occurrence of the termination anomaly may include detecting at runtime an information loss situation.

The details of one or more implementations are set forth in the accompanying drawings and the description below. Other features will be apparent from the description and drawings, and from the claims.

DETAILED DESCRIPTION

Figure 1:
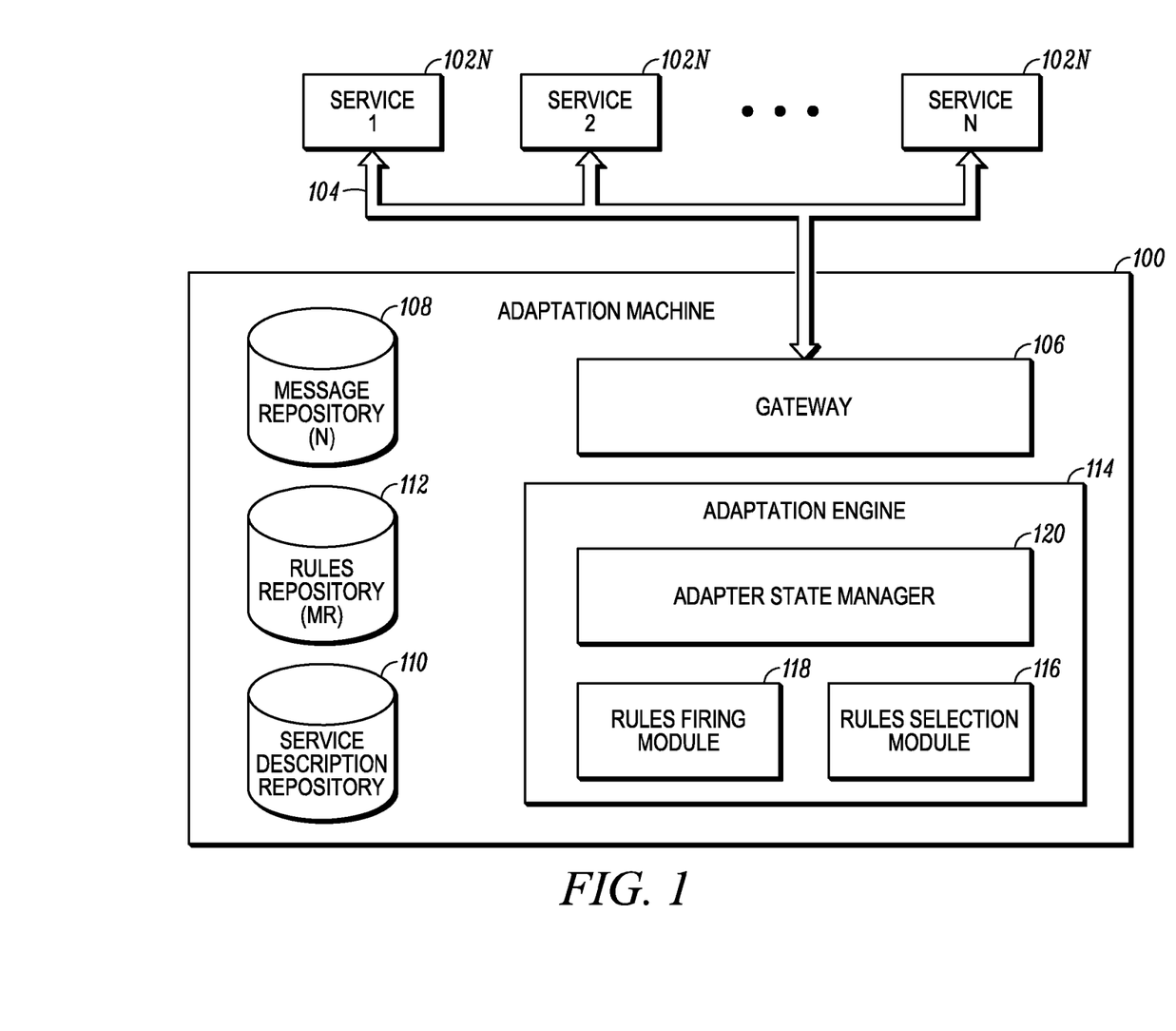
FIG. 1 is a block diagram of an exemplary adaptation machine.

Referring to FIG. 1, an adaptation machine 100 is illustrated. The adaptation machine 100 may reconcile pairs of incompatible services by intercepting, transforming and forwarding messages according to a set of mapping rules. The adaptation machine 100 may mask and resolve incompatibilities by transparently enacting the role of a compatible partner for each of the acting services. One or more services 102N may communicate with each other and with the adaptation machine 100 using a communication network 104. The services 102N may represent any type of services that engage in transactions where messages are communicated between the services. The services 102N may be compatible or incompatible with each other with respect to exchanging and recognizing messages. The adaptation machine 100 may be configured to resolve the incompatibilities between the services 102N. The communication network 104 may include any type of communication network such as, for example, a wireless network, a wired network, the Internet, or any other type of communication network.

The adaptation machine 100 may include a gateway 106, a message repository 108, a service description repository 110, a rules repository 112, and an adaptation engine 114. The adaptation engine 114 may include a rules selection module 116, a rules firing module 118, and an adapter state manager 120.

The gateway 106 may be configured to intercept messages being exchanged between multiple services 102N. For example, the gateway 102 may interface with the communications network 104 to intercept the messages being exchanged between the services 102N. In one implementation, the gateway 106 may sit on top of a communications channel such as, for example, a transmission control protocol/internet protocol (TCP/IP) channel. In addition to intercepting messages, the gateway 106 may release messages prepared and generated by the adaptation engine 114 that are destined for one or more of the services 102N. For example, if the adaptation engine 114 generates outgoing messages and releases the outgoing messages, the gateway 106 may communicate the outgoing messages to the services 102N using the communications network 104.

The message repository 108 may be logically coupled to the gateway 106 and may be configured to store the intercepted messages. The message repository 108 may be a buffer to store one or more messages of one or more message types. For example, the message repository may store the messages received by the adaptation machine 100 through the gateway 106. Messages received and stored in the message repository 108 may be designated as "BR", where BR denotes a set of messages that has been intercepted by the adaptation machine 100. Additionally, the message repository 108 may store messages that have been created by the adaptation engine 114. For example, the message repository 108 may include a buffer of messages designated as "BC" that denote a set of messages that have been created by the adaptation engine 114. Upon initialization of the adaptation machine 100, the message repository 108, including its buffers, may be empty. The overall set of messages that is in the message repository may be designated as "B" which is the union of the messages that have been intercepted by the adapter, BR, and the messages that have been created by the adaptation engine, BC.

In one exemplary implementation, the message repository 108 also may include a set of messages that have been forwarded by the adaptation machine 100 to one or more services 102N. The set of messages that have been forwarded may be designated as "F". Upon initialization of the adaptation machine 100, the set F may be empty. The set of messages that have been forwarded by the adaptation machine 100 may correspond to the outgoing messages from the adaptation machine 100.

The service description repository 110 may be configured to store multiple service descriptions, where each of the service descriptions corresponds to one of the services 102N. The service description may include a service interface. The service interface of a service may capture control dependencies over the set of possible message exchanges between the service and its environment. The service interface may include a finite state machine (FSM), that may be referred to as a service interface FSM. A service interface FSM may include states and transitions. Each transition may be labelled either by a send or receive action. A transition may include a direction (e.g., !send and ?receive) and a message type. For example, "!purchase order" may be used to denote the action of sending a purchase order. The message types may be referred to by name without describing their underlying structure. Typically only one send or receive action may be represented per transition. A send and receive action may come in pairs (e.g., a request and a response).

A service interface FSM may contain one start state (i.e., a state without incoming transitions), one or more end states (i.e., a state without outgoing transitions), and at least one transition (i.e., a service must send or receive at least one message). A service interface FSM may capture a life cycle of each instance of a service, from start state to one of the end states. When a service instance reaches any one end state, it may be said to have completed.

The rules repository 112 may be configured to store mapping rules. Each mapping rule may describe the transformation between one or multiple source message types and a target message type. The adaptation engine 114 may fire these rules in a chained manner to produce messages expected by the interacting services from previously intercepted messages. Mapping rules may not be attached to any particular given pair of service descriptions. Instead, the rules repository 112 may be a common repository of mapping rules so that mapping rules that may be defined to reconcile differences between a given pair of services may seamlessly be used subsequently for other pairs of services.

A mapping rule may be composed of one or multiple input patterns, one output template, and a data transformation function. The transformation function may describe how the messages that match the input pattern are converted to the desire output. For example, if messages were represented in XML, the transformation function may be encoded in extensible stylesheet language transformations (XSLT). Other languages may be used to encode the transformation function.

Input patterns may take different forms, which correspond to a message type. An input pattern may be a message type. Such pattern matches and consumes a single message of that type. Similarly, an output template may take the form of a message type, in which case the rule in question may produce a single message of that type.

In one exemplary implementation, the repository of mapping rules 112 contains the set of rules shown in Table 1. In this example, the rules repository 112 includes 10 mapping rules that may be used for mediating between two service interfaces. The rules repository 112 may include a collection of rules accumulated over a number of adaptation scenarios. Thus, not every rule in the rules repository 112 may be relevant to every scenario.

TABLE 1

| rule id | rule syntax |
| --- | --- |
| mr1 | PurchaseOrder → POrder |
| mr2 | POrder → PO |
| mr3 | POrder,OrderDetails → PO |
| mr4 | POResponse,OrderUpdate → OrderResponse |
| mr5 | POUpdate+(POConfirm) → OrderUpdate |
| mr6 | POItems → OrderItems |
| mr7 | POConfirm → OrderConfirm |
| mr8 | POConfirm → OrderUpdate |
| mr9 | PurchaseOrder → OrderDetails |
| mr10 | POItems → OrderItem+ |

In one exemplary implementation, a mapping rule may represent a single message of a single type that may be transformed into a single message of a single type. For example, in Table 1, rule mr1 stipulates that a single message of the type PurchaseOrder may be transformed into a single output message of the type POrder.

In another exemplary implementation, a mapping rule may represent multiple messages of the same type that also may be combined with another message type and may be transformed to produce a single output message of a single type. For example, in Table 1, mapping rule mr5 illustrates that multiple messages of type POUpdate may be combined with a message of type POConfirm and transformed into a single message of type OrderUpdate.

In another exemplary implementation, a mapping rule may transform an input message of a single type into multiple output messages of the same type. For example, in Table 1, mapping rule mr10 illustrates an input message type POItems that may be transformed into multiple messages of the same type OrderItem. The rules repository 112, as illustrated in Table 1, illustrates that the adaptation machine 100 may produce rules of a single type. By using rules that produce outgoing messages of a single type, the adaptation machine 100 may efficiently transform messages between multiple services 102N.

The service description repository 110 also may include the different types of messages to be received and to be expected by the different services 102N. The service description repository 110 also may include an order in which the messages are expected for a particular service 102N. For example, the order may be related to an order in which its service may consume messages and/or the order may be related to an order in which a service produces messages. For example, one of the services 102N may expect to see an invoice message before that service sends a message type of payment notice. In another example, a service may receive a delivery of goods message and then issue a payment message without needing an invoice message. The service description repository 110 may track the order for which messages are expected to be sent and received. Thus, the service descriptions contained within the service description repository 110 may capture the order in which a service may consume and/or produce messages.

In one exemplary implementation, the adaptation machine 100 may only forward a message when a service is in a state to consume the message. For example, the service description repository 110 that includes the service descriptions may inform the adaptation engine 114 as to when a particular service is in a state to consume a message that is to be forwarded.

The adaptation engine 114 may be configured to generate a sequence of firing rules using the service descriptions and the mapping rules responsive to the intercepted messages. The adaptation engine 114 may be configured to generate one or more outgoing messages in response to the intercepted messages using a sequence of firing rules. The adaptation engine 114 may be configured to detect at runtime an occurrence of a termination anomaly. In one exemplary implementation, the termination anomaly may include a deadlock situation. In another exemplary implementation, the termination anomaly may include an information loss situation. The adaptation engine 114 may include the rules selection module 116, the rules firing module 118 and the adapter state manager 120.

The rules selection module 116 may be configured to retrieve one or more of the intercepted messages from the message repository 108. The rules selection module 116 also may be configured to retrieve one or more of the mapping rules from the rules repository 112 and retrieve one or more of the service descriptions from the service description repository 110. The rules selection module 116 may determine whether the intercepted messages are expected and may retain expected messages. Determining whether the intercepted messages are expected may be based on the state of a particular service as indicated by the service description retrieved from the service description repository 110. The rules selection module 116 may relate the expected messages to the mapping rules and to the service descriptions and generate sequence of the firing rules using the service descriptions and the mapping rules.

The rules firing module 118 may be configured to execute the sequence of the firing rules and to release a single output message type to the gateway 106 for communication to one of the services 102N. The rules firing module 118 may use the sequence of the firing rules generated by the rules selection module 116 to fire the sequence of the firing rules and to release the output message type. In one exemplary implementation, the rules firing module 118 may execute and release multiple instances of the same message type.

The adapter state manager 120 may be configured to maintain a message repository 108, to monitor the state for each of the instance of the services 102N, to track a history of the sequence of the firing rules and to initiate a generation of the sequence of the firing rules and the generation of the outgoing messages. The adapter state manager 120 may use the message repository state, the service state for each of the services and the history of the sequence of the firing rules in order to initiate the generation of the sequence of the firing rules and the generation of the outgoing messages.

In one exemplary implementation, the adapter state manager 120 may perform its functionality using one or more functions. For example, the adapter state manager 120 may use a function "E" that takes an adapter state and returns a set of message types that are currently expected to be received by the adaptation machine 100. The message type may be a function which takes a send or receive action and returns the message type being sent or received respectively by that action. For a given adaptation machine 100 state, the function E may be derived from a set of send actions enabled to a state of one of the services and those at the state for another of the services.

In another exemplary implementation, another function "R" may take an adapter state and return a set of message types that are currently required to be forwarded by the adaptation machine 100. Given an adapter state, the function R may be derived from a set of received actions enabled at the state of a service and those at a state of another service. The set R may be empty upon initialization meaning that no message is required to be forwarded.

Figure 2:
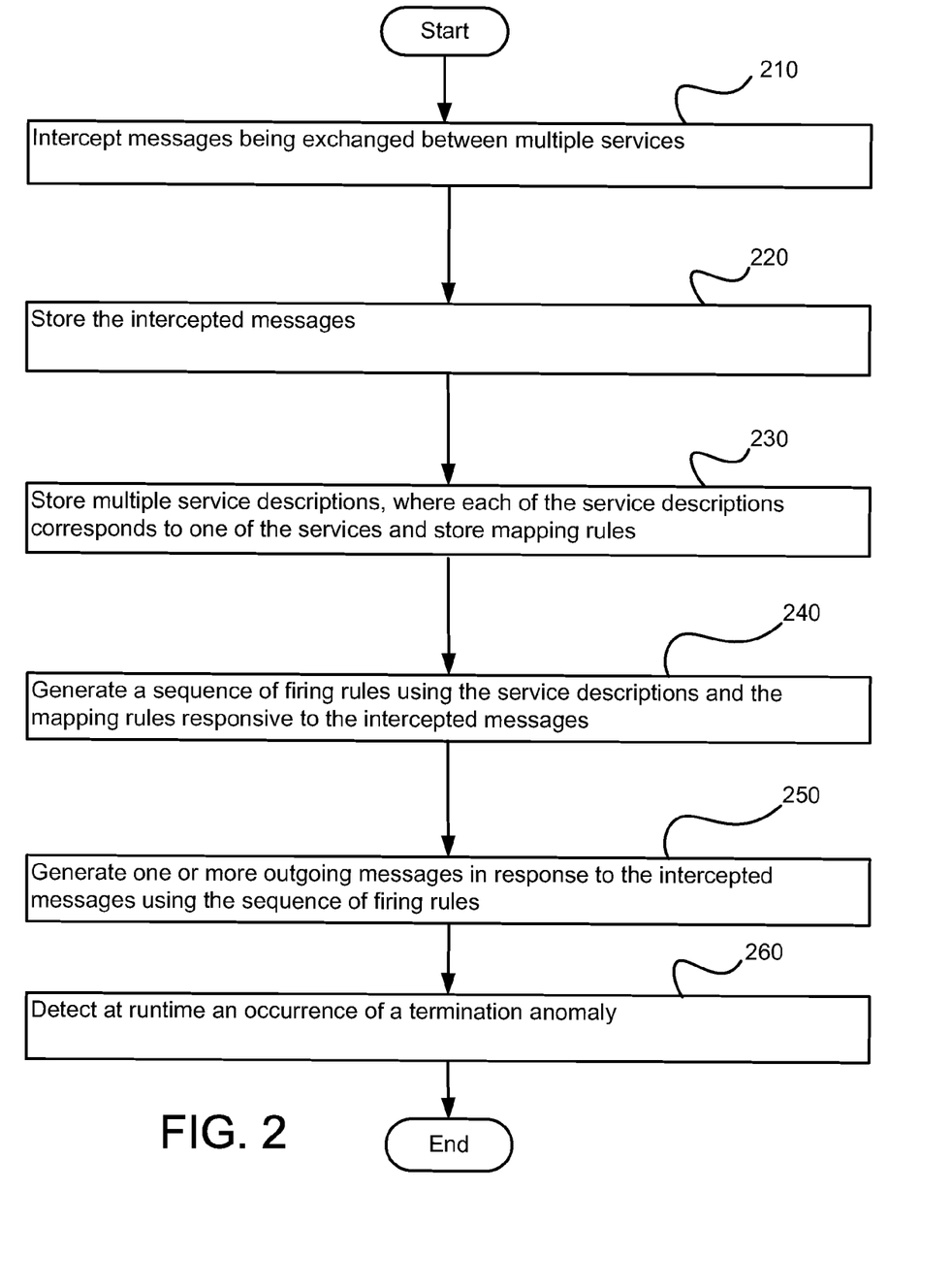
FIG. 2 is a flowchart illustrating example operations of the system of FIG. 1.

Referring to FIG. 2, a process 200 illustrates example operations of a system of FIG. 1. Process 200 may include intercepting messages being exchanged between multiple services (210), storing the intercepted messages (220), storing multiple service descriptions, where each of the service descriptions corresponds to one of the services, and storing mapping rules (230), generating a sequence of firing rules using the service descriptions and the mapping rules responsive to the intercepted messages (240), generating one or more outgoing messages in response to the intercepted messages using the sequence of firing rules (250), and detecting at runtime an occurrence of a termination anomaly (260).

In one exemplary implementation, the gateway 106 may intercept messages being exchanged between multiple services 102N (210). For example, after initialization the gateway 106 may listen to the incoming messages from one or more of the services 102N. The message repository 108 may store the intercepted messages (220). The service description repository 110 may store the multiple service descriptions, where each of the service descriptions corresponds to one of the services (230). As discussed above, the service description repository 110 may store the multiple service descriptions that may include descriptions of services as well as an order in which the services may expect to receive or to send message types. The rules repository 112 may be configured to store the mapping rules (230).

The adaptation engine 114 may be configured to generate a sequence of firing rules using the service descriptions and the mapping rules responsive to the intercepted messages (240). More specifically, the rules selection module 116 within the adaptation engine 114 may generate the sequence of firing rules. The adaptation engine 114 may generate one or more outgoing messages in response to the intercepted messages using the sequence of firing rules (250). More specifically, the rules firing module 118 may generate the one or more outgoing messages. The adaptation engine 114 may be configured to detect at runtime an occurrence of a termination anomaly (260). In one exemplary implementation, detecting the occurrence of a termination anomaly may include detecting the occurrence of a deadlock situation. In this example, the adaptation engine 114 may be configured to detect the occurrence of the deadlock situation.

In another exemplary implementation, detecting an occurrence of the termination anomaly may include detecting the occurrence of an information loss situation. In this example, the adaptation engine 114 may be configured to detect at runtime the occurrence of the information loss situation.

Figure 3:
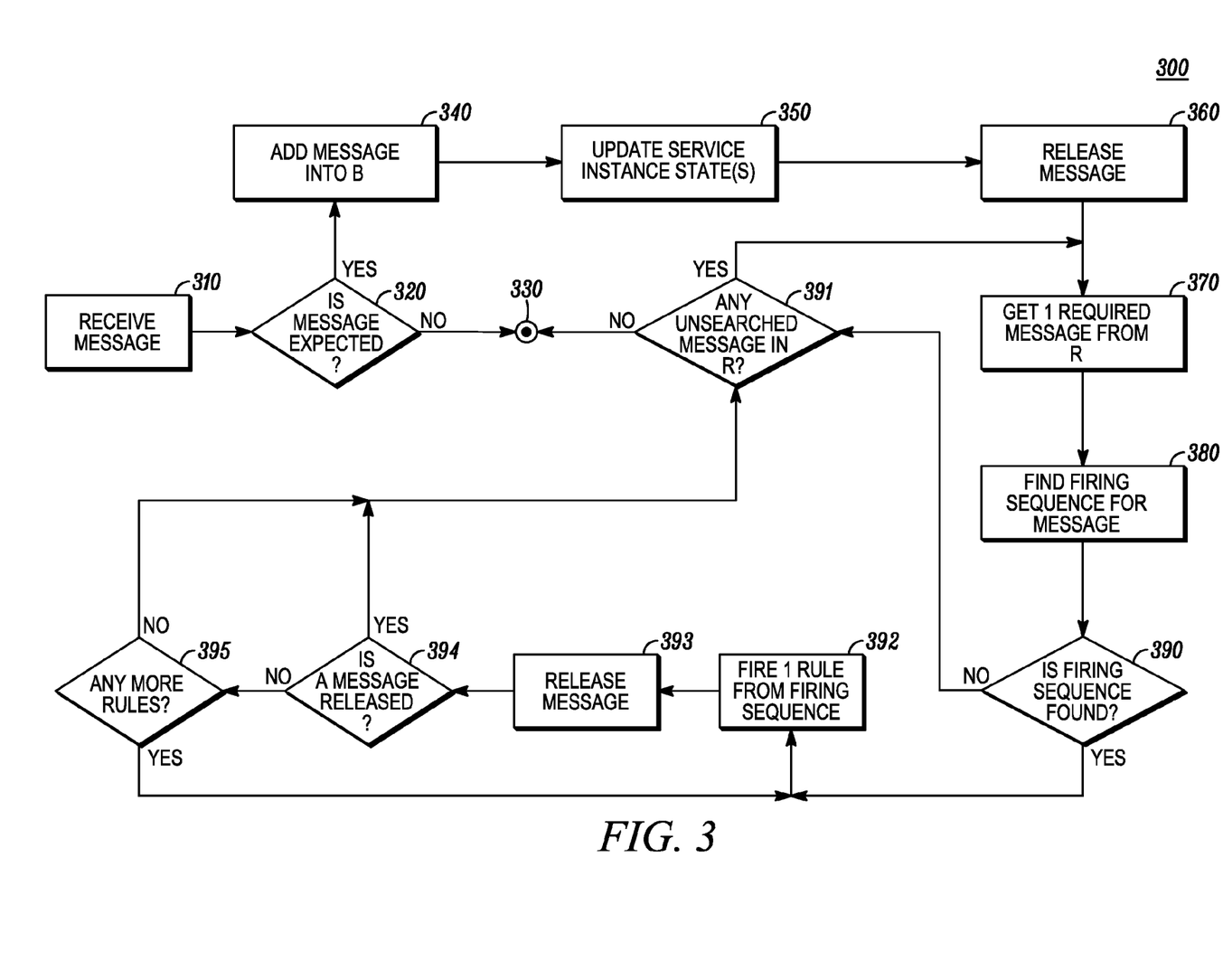
FIG. 3 is a flowchart illustrating example operation of an adaptation cycle.

Referring to FIG. 3, a flowchart 300 illustrates example operations of an adaptation cycle. Process 300 may be performed by the adaptation machine 100. Process 300 includes receiving a message (310). The adaptation cycle may be triggered to begin upon the receipt of the message. In one exemplary implementation, the adaptation cycle represented by process 300 may only be triggered upon the receipt of a message. Thus, if no message is received, then the adaptation cycle will not be triggered. The message may be received by the gateway 106 (310).

Next, it is determined whether or not a received message was expected (320). The determination of whether or not a message is expected may be a function of the state of one or more of the services 102N as stored in the service description repository 110. The adapter state manager 120 may use the information within the service description repository 110 to determine whether or not the message was expected to be received.

If the adapter state manager 120 determines that the received message was not expected, then the received message may be dropped (330). Additionally and/or alternatively, if the adapter state machine 120 determines that the received message is not expected, then the adaptation cycle may be stopped (330).

If the adapter state manager 120 determines that the received message was expected, then the received message is added into the message repository (340). The received message may be added to the message repository 108 and separated into a buffer BR that represents a buffer of the received messages.

The state of a service instance monitored by the adapter state manager 120 may be updated (350). Following the update to the service instance state, process 300 determines whether or not any messages can be released (360). The process to release messages is described more fully below with respect to FIG. 5. The adaptation engine 114 may be configured to release messages (360) given the current state of the system as indicated by the state of the services maintained in the service description repository 110.

Thus, messages may be released without needing to determine a sequence of firing rules and without needing to fire any of the rules. This situation may occur, for example, when a previously received message has triggered an adaptation cycle wherein the received message is transformed into five outgoing messages. However, maybe only one of the five outgoing messages may be sent to the target service because the target service may be in a state where it is only ready to receive one message of that type of message. The other four outgoing messages may be held and not released because the target service is not yet ready to receive these other messages. When the target service reaches a state where it is ready to receive these other messages, then one or more of the remaining messages that were generated may be released to the target service. Thus, releasing the messages (360) may be performed during a particular adaptation cycle without having to generate any subsequent firing rules.

Following the release of any messages (360), the adaptation cycle proceeds to identify one required message type by inspecting the state of the service instances monitored by the adapter state manager 120 (370). The adapter state manager 120 may be configured to perform a function R to get the required message using the function R (370). Once the adapter state manager 120 has determined a message type that may be required to be fired (370), a firing sequence may be found that leads to the production of a message of this type (380). Finding the firing sequence (380) is discussed in more detail below with respect to FIG. 4.

If the firing sequence is not found (390), then another search is conducted for other message types that are required to be released (391). If there are still message types for which a firing sequence has not been searched and that are required to be released (391), then the process repeats itself by identifying a required message type from inspection of the adapter state maintained by the adapter state manager (370) and searching for a firing sequence that leads to the production of a message of the identified message type (380). This process continues to repeat itself until either a firing sequence is found (390) or there are no unsearched message types that are required to be released (391). If there are no unsearched message types remaining, then the adaptation cycle may be stopped (330).

The traversing of the list of message types in R stops as soon as one firing sequence is found (390). A firing sequence may be found when a function for finding the firing sequence returns a non-empty list of mapping rules. Once a firing sequence is found, the firing sequence may be fired (392). The rules firing module 118 may be configured to fire the mapping rules in the firing sequence, as described in more detail below with respect to FIG. 6.

Firing the rules from the firing sequence (392) includes firing, in order, one at a time a list of mapping rules in the firing sequence. After each rule firing (392), the adaptation cycle checks again if any message types can be released (393). Since firing a mapping rule and releasing messages causes an update to the state of the service instances monitored by the adapter state manager 120. The list of message types in function R and another firing sequence is then sought for. Thus, if a message is released (394), then the set of message types that are required to be released are searched again (391). If a message is not released (394), then the determination is made whether there are any more rules to fire (395). If there are more rules to fire (395), then the rules from the firing sequence is fired (392), any messages that can be released are released (393) and a determination is made whether a message has been released (394).

The search continues until no firing sequence can be found (i.e., firing sequence returns an empty list of mapping rules) after traversing the entire list of message types in R. The adaptation cycle 300 may be completed when no more actions are possible. When no more actions are possible, the adaptation machine 100 returns to listening for incoming messages using the gateway 106. Once a message arrives satisfying the precondition for executing the adaptation cycle, another adaptation cycle will start. This process may be repeated until a terminating condition is fulfilled. A terminating condition may be when both service interface FSMs reach one of their end states.

Figure 4:
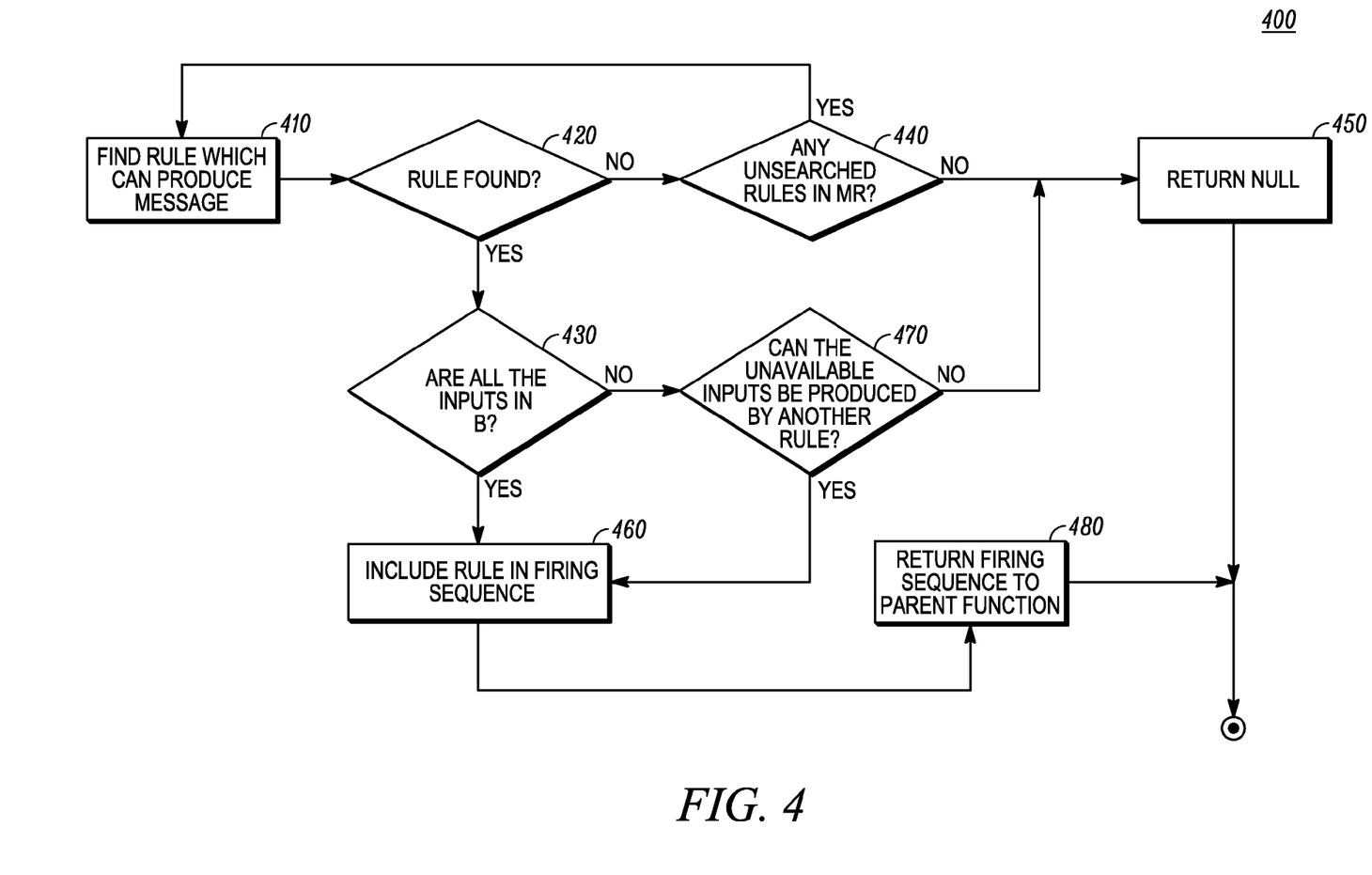
FIG. 4 is a flowchart illustrating example operations for finding a firing sequence as part of the adaptation cycle.

Referring to FIG. 4, a process 400 is illustrated showing example operations for finding a firing sequence as part of the adaptation cycle from process 300 of FIG. 3. Process 400 may be a backward-chaining depth-first search algorithm that determines if there exists in the mapping rules repository 112 a set of rules for producing a certain message type. Process 400 may take into account the state of the services in the service description repository 110, required message types, and a set of message types that have been visited along the search. Process 400 may return a list of mapping rules that, if not empty, will produce at least one message when fired.

Process 400 may begin by finding the rules repository 112 that can produce at least one message of the required output message type (410). If a rule is found (420), then a determination is made whether all the inputs of the rule are available (430). If no rule is found (420), then the search continues for any unsearched rules in the rules repository 112 (440). If there are no unsearched rules remaining in the rules repository 112 (440), then process 400 may return a null set (450).

If all of the inputs for the rules are available (430), then the rule is included in the firing sequence (460). If not all of the inputs are available (430), then a determination is made, recursively, whether the unavailable inputs may be produced by another rule (470). If the unavailable inputs can not be produced by another rule (470), then a null set is returned (450). If the unavailable inputs can be produced by another rule (470), then the rule is included in the firing sequence (460). Once a rule is included in the firing sequence (460), then the firing sequence may be returned to the parent function as illustrated in process 300 of FIG. 3. Thus, returning the firing sequence to the parent function (480) brings the function back to process 300 at step 380.

Figure 5:
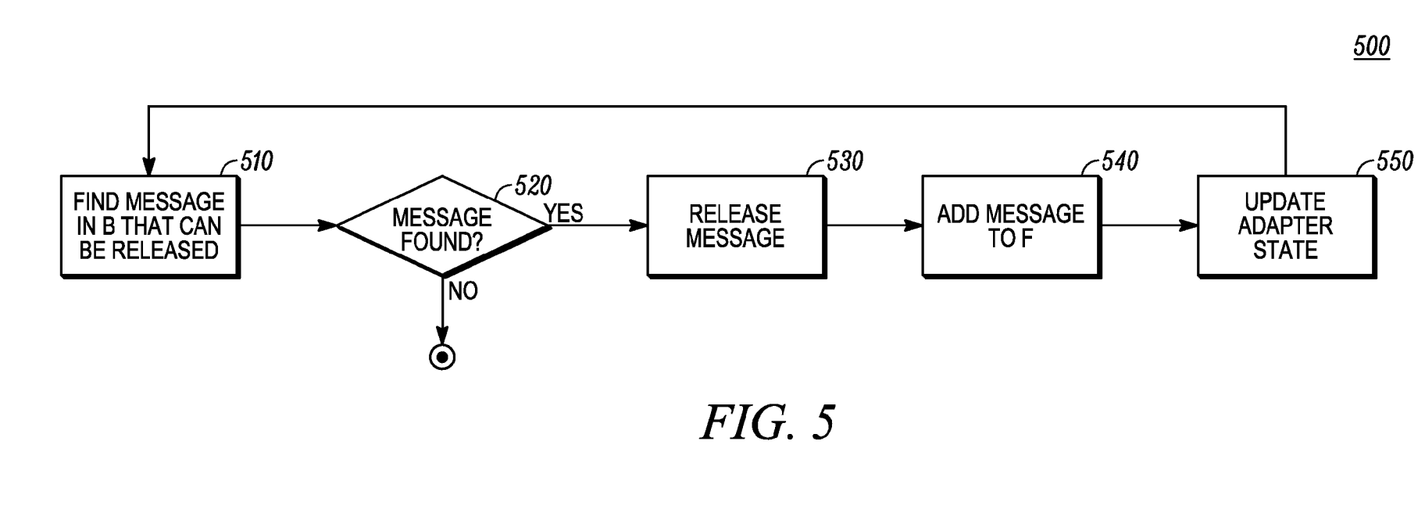
FIG. 5 is a flowchart illustrating example operations for releasing messages as part of the adaptation cycle.

Referring to FIG. 5, a process 500 illustrates example operations for releasing messages as part of the adaptation cycle. Process 500 may be executed to release any message that may be available in the message repository but that has not been previously released and is of a type that is required to be forwarded. Upon message release the message may be added to the set of messages that have been forwarded by the adaptation machine 100.

Process 500 includes finding messages in the message repository 108 that can be released (510). If a message is not found (520), then a null is returned and the process ends. If a message is found (520), then the message is released (530). A released message may be added to the set of messages that have been forwarded (540) and the state of the services in the service description repository 110 may be updated (550).

Process 500 may be a recursive process in that after the state of the services has been updated the process 500 repeats itself by re-finding a message in the message repository 108 that may be released based on the updated state (510). The process continues until no messages are found that can be released.

Figure 6:
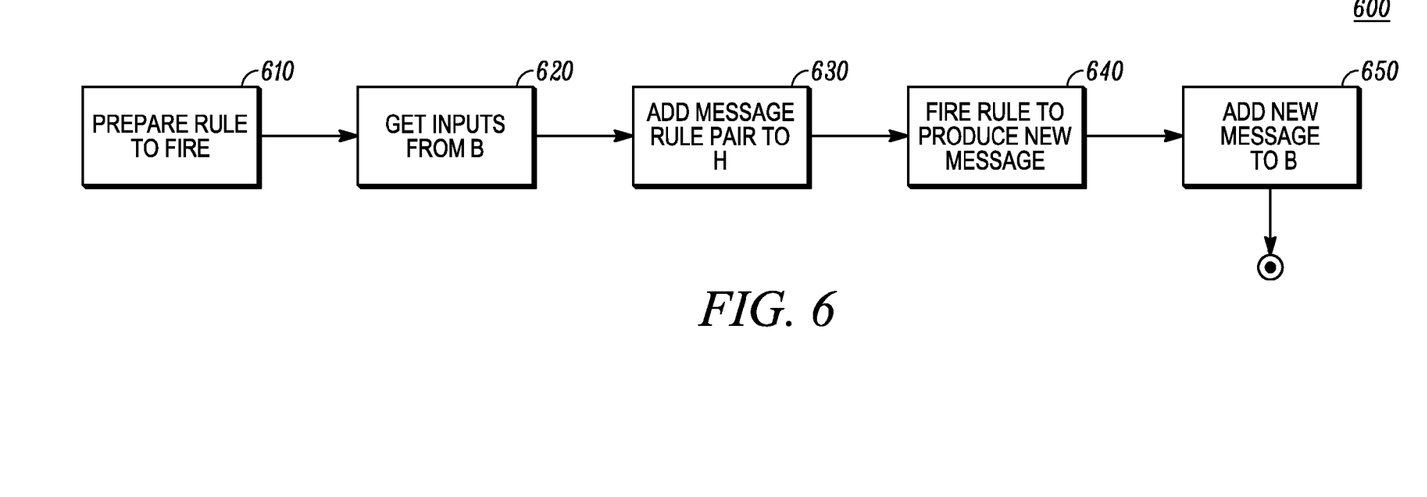
FIG. 6 is flowchart illustrating example operations for firing rules as part of the adaptation cycle.

Referring to FIG. 6, a process 600 is illustrated showing example operations for firing rules as part of the adaptation cycle. Process 600 may be performed by the rules firing module 118 of FIG. 1. Process 600 includes preparing the rule to fire (610) and getting inputs from the message repository 108 (620). The message is then added to the history of rules firing (630) that may be represented by a set of message-rule pairs, where a message-rule pair includes a message and a mapping rule. Once the message has been added to the rule pair (630), the rule may be fired to produce the new message (640). Once the message has been produced (640), the new message is added to the message repository 108 (650).

The adaptation engine 114 may be configured to determine when an occurrence of a termination anomaly may occur. A termination anomaly may be derived from a set of variables given to an adapter instance. In one exemplary implementation, the adaptation engine may determine an occurrence of a deadlock situation. A deadlock may occur when the adapter terminates but a service is left waiting indefinitely for one or more messages to arrive. A deadlock situation may be determined by checking if the adaptation machine is still required to forward any messages, yet it does not expect to receive messages. This condition can be determined, for example, by inspecting the function R and the state of the service instances monitored by the adapter state manager 120.

The adaptation engine 114 may take one of several actions upon detecting a termination anomaly. For example, the adaptation engine may provide an indication to one or more of the services 102N that a termination anomaly, such as a deadlock situation, has occurred. A message may be sent to the services 102N using gateway 106 over the communication network 104. Thus, once the adaptation cycle 300 is complete, the adaptation engine 114 may look to the message repository 108 to see if there are any remaining messages. The adapter state manager 120 may determine from the function R that there are still message types that are currently required to be forwarded to one or more of the services. When this occurs, the adaptation machine and the services may be in a deadlock situation.

In another exemplary implementation, the adaptation engine 114 may determine whether or not an information loss has occurred. An information loss or message loss may be defined as a content (i.e., message) that is intercepted or created by the adaptation machine 100 and that at the end of the life cycle of the service instance that created this content, is not used by any rules or released by the adaptation machine. The adaptation engine 114 may be configured to determine whether or not an information loss has occurred during runtime.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor;
   a gateway that is arranged and configured to intercept messages being exchanged between multiple services;
   a message repository that is logically coupled to the gateway and that is arranged and configured to store the intercepted messages;
   a service description repository that is arranged and configured to store multiple service descriptions, wherein each of the service descriptions corresponds to one of the services;
   a rules repository that is arranged and configured to store mapping rules; and
   an adaptation engine, executed by the at least one processor, that is arranged and configured to:
   generate a sequence of firing rules using the service descriptions and the mapping rules responsive to the intercepted messages;
   generate one or more outgoing messages in response to the intercepted messages using the sequence of firing rules;
   wherein the adaptation engine comprises an adapter state manager that is arranged and configured to:
   maintain the message repository,
   monitor a service state for each instance of the services,
   track a history of firing rules that have been fired, and
   initiate the generation of the sequence of firing rules and the generation of the outgoing messages using the message repository, the service state for each of the instances of the services and the history of the firing rules, wherein the history of firing rules is represented by a set of message rule pairs, wherein each message rule pair includes a message and a mapping rule.

2. The system of claim 1 wherein the message repository is arranged and configured to store and to track the outgoing messages.

3. The system of claim 1 wherein the service description repository includes a service interface finite state machine for each of the services, where the service interface finite state machine captures a life cycle of each instance of the service from a start state to an end state.

4. The system of claim 3 wherein the service interface finite state machine includes states and transitions.

5. The system of claim 1 wherein the mapping rules are independent of a particular service description such that the mapping rules are applicable to multiple different service descriptions.

6. The system of claim 1 wherein the adaptation engine is arranged and configured to detect, at runtime, an occurrence of a termination anomaly, wherein the termination anomaly is a deadlock situation.

7. The system of claim 1 wherein the adaptation engine is arranged and configured to detect, at runtime, an occurrence of a termination anomaly, wherein the termination anomaly is an information loss situation.

8. The system of claim 1 wherein the adaptation engine comprises:
   a rules selection module that is arranged and configured to:
   retrieve one or more of the intercepted messages from the message repository;
   retrieve one or more of the mapping rules from the rules repository;
   retrieve one or more of the service descriptions from the service descriptions repository;
   determine whether the intercepted messages are expected and to retain expected messages; and
   relate the expected messages to the mapping rules and to the service descriptions and to generate the sequence of firing rules using the service descriptions and the mapping rules responsive to the intercepted messages.

9. The system of claim 1 wherein the adaptation engine comprises a rules firing module that is arranged and configured to execute the sequence of firing rules and to release a single output message to the gateway for communication to one of the services.

10. The system of claim 1 wherein the adaptation engine is further arranged and configured to provide an indication to one or more of the services when the occurrence of the termination anomaly is detected.

11. A system, comprising:
    at least one processor;
    a gateway that is arranged and configured to intercept messages being exchanged between multiple services;
    a message repository that is logically coupled to the gateway and that is arranged and configured to store the intercepted messages;
    a service description repository that is arranged and configured to store multiple service descriptions, wherein each of the service descriptions corresponds to one of the services;
    a rules repository that is arranged and configured to store mapping rules; and
    an adaptation engine, executed by the at least one processor, that comprises:
    a rules selection module that is arranged and configured to:
    retrieve one or more of the intercepted messages from the message repository;
    retrieve one or more of the mapping rules from the rules repository;
    retrieve one or more of the service descriptions from the service descriptions repository;
    determine whether the intercepted messages are expected and to retain expected messages; and
    relate the expected messages to the mapping rules and to the service descriptions and to generate a sequence of firing rules using the service descriptions and the mapping rules responsive to the intercepted messages;
    a rules firing module that is arranged and configured to execute the sequence of firing rules and to release a single output message to the gateway for communication to one of the services; and
    an adapter state manager that is arranged and configured to maintain the message repository, to monitor a service state for each instance of the services, to track a history of firing rules that have been fired and to initiate the generation of the sequence of firing rules and the generation of the outgoing messages using the message repository, the service state for each of the instances of the services and the history of the firing rules, wherein the history of firing rules is represented by a set of message rule pairs, wherein each message rule pair includes a message and a mapping rule.

12. The system of claim 11 wherein the adaptation engine is arranged and configured to detect at runtime an occurrence of a termination anomaly.

13. The system of claim 12 wherein the termination anomaly is a deadlock situation.

14. The system of claim 12 wherein the termination anomaly is an information loss situation.

15. The system of claim 11 wherein the service description repository includes a service interface finite state machine for each of the services, where the service interface finite state machine captures a life cycle of each instance of the services from a start state to an end state.

16. The system of claim 11 wherein the mapping rules are independent of a particular service description such that the mapping rules are applicable to multiple different service descriptions.

17. A method including executing instructions recorded on a non-transitory computer-readable storage media using at least one processor, comprising:
　intercepting messages being exchanged between multiple services;
　storing the intercepted messages;
　storing multiple service descriptions, wherein each of the service descriptions corresponds to one of the services;
　storing mapping rules;
　generating a sequence of firing rules using the service descriptions and the mapping rules responsive to the intercepted messages;
　generating one or more outgoing messages in response to the intercepted messages using the sequence of firing rules;
　monitoring a service state for each instance of the services;
　tracking a history of firing rules that have been fired; and
　initiating the generation of the sequence of firing rules and the generation of the outgoing messages using the stored messages, the service state for each of the instances of the services and the history of the firing rules, wherein the history of firing rules is represented by a set of message rule pairs, wherein each message pair includes a message and a mapping rule.

18. The method as in claim 17 further comprising detecting at runtime the occurrence of a termination anomaly, wherein the termination anomaly includes a deadlock situation.

19. The method as in claim 17 further comprising detecting at runtime the occurrence of a termination anomaly, wherein the termination anomaly includes an information loss situation.

* * * * *